(12) United States Patent
Tanabe (10) Patent No.: US 8,194,151 B2
(45) Date of Patent: Jun. 5, 2012

(54) IMAGE PICKUP APPARATUS (75) Inventor: Kazuhiro Tanabe, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1127 days.

(21) Appl. No.: 12/073,379

(22) Filed: Mar. 5, 2008

(65) Prior Publication Data

US 2008/0239156 A1 Oct. 2, 2008

(30) Foreign Application Priority Data

Mar. 28, 2007 (JP) ................................. 2007-083258

(51) Int. Cl.
*H04N 9/73* (2006.01)
(52) U.S. Cl. .................... 348/223.1; 348/222.1; 348/649
(58) Field of Classification Search ................ 348/223.1
See application file for complete search history.

(56) References Cited

U.S. PATENT DOCUMENTS

| | | | |
|---|---|---|---|
| 2005/0052546 A1* | 3/2005 | Nakabayashi et al. | 348/223.1 |
| 2007/0140579 A1* | 6/2007 | Miyashita | 382/254 |
| 2008/0111896 A1* | 5/2008 | Yoshino et al. | 348/223.1 |

\* cited by examiner

*Primary Examiner* — Sinh Tran
*Assistant Examiner* — Paul Berardesca
(74) *Attorney, Agent, or Firm* — Bacon & Thomas, PLLC (57) ABSTRACT

An image pickup apparatus is equipped with an image pickup device in which pixels coated with different color filters are arranged. Further, the image pickup apparatus includes a separation unit that separates a video signal outputted from the pixels coated with the different color filters into three color image signals; an adjustment signal generation unit for generating a color balance adjustment signal and a hue adjustment signal from the separated three color image signals; and an adjustment unit for adjusting the video signal outputted from the pixels coated with the different color filters by using the color balance adjustment signal and hue adjustment signal generated by the adjustment signal generation unit.

10 Claims, 8 Drawing Sheets

| | 1 | 2 | 3 | 4 | 5 | 6 | ... | M-1 | M |
|---|---|---|---|---|---|---|---|---|---|
| 1st LINE | G11 | R12 | G13 | R14 | G15 | R16 | ... | G1(M-1) | R1M |
| 2nd LINE | B21 | G22 | B23 | G24 | B25 | G26 | ... | B2(M-1) | G2M |
| 3rd LINE | G31 | R32 | G33 | R34 | G35 | R36 | ... | G3(M-1) | R3M |
| 4th LINE | B41 | G42 | B43 | G44 | B45 | G46 | ... | B4(M-1) | G4M |
| 5th LINE | G51 | R52 | G53 | R54 | G55 | R56 | ... | G5(M-1) | R5M |
| 6th LINE | B61 | G62 | B63 | G64 | B65 | G66 | ... | B6(M-1) | G6M |
| ... | ... | ... | ... | ... | ... | ... | ... | ... | ... |
| (N-1)th LINE | G(N-1)1 | R(N-1)2 | G(N-1)3 | R(N-1)4 | G(N-1)5 | R(N-1)6 | ... | G1(N-1)(M-1) | R(N-1)M |
| Nth LINE | BN1 | GN2 | BN3 | GN4 | BN5 | GN6 | ... | BN(M-1) | GNM |

IMAGE PICKUP APPARATUS

FIELD OF THE INVENTION

The present invention relates to an image pickup apparatus such as a video camera or the like; and, more particularly, to an image pickup apparatus and a method capable of adjusting a video signal (raw signal) output from a color CCD (Charge Coupled Device) installed in the image pickup apparatus.

BACKGROUND OF THE INVENTION

Conventionally, in a 3CCD video camera, white balance adjustment is carried out by controlling amplification factors of an R (red) video signal, a G (green) video signal and a B (blue) video signal according to the kind of light source (see, for example, Japanese Patent Application Publication No. 2001-008223).

In case of a single CCD color video camera for inspection or the like, a raw signal is preferable as a digital video signal outputted therefrom in terms of data transmission amount and image processing simplicity, but has a drawback in that image adjustment such as white balancing is difficult to be performed directly on the raw signal.

SUMMARY OF THE INVENTION

In accordance with one aspect of the present invention, there is provided a video signal adjusting method for use in an image pickup apparatus employing an image pickup device in which pixels coated with different color filters are arranged, the method including: separating a video signal outputted from the pixels coated with the different color filters into three color image signals; generating a color balance adjustment signal and a hue adjustment signal from the separated three color image signals; and adjusting the video signal outputted from the pixels coated with the different color filters by using the color balance adjustment signal and the hue adjustment signal.

In accordance with another aspect of the present invention, there is provided an image pickup apparatus including: an image pickup device in which pixels coated with different color filters are arranged; a separation unit that separates a video signal outputted from the pixels coated with the different color filters into three color image signals; an adjustment signal generation unit for generating a color balance adjustment signal and a hue adjustment signal from the separated three color image signals; and an adjustment unit for adjusting the video signal outputted from the pixels coated with the different color filters by using the color balance adjustment signal and hue adjustment signal generated by the adjustment signal generation unit.

In accordance with the present invention, color balance adjustment, hue adjustment and contour enhancement can be performed on a raw signal outputted from a single CCD color video camera.

BRIEF DESCRIPTION OF THE DRAWINGS

The above features of the present invention will become apparent from the following description of an embodiment given in conjunction with the accompanying drawings, in which.

DETAILED DESCRIPTION OF THE EMBODIMENT

Hereinafter, an image pickup apparatus in accordance with an embodiment of the present invention will be described with reference to FIG. 1.

Figure 1:
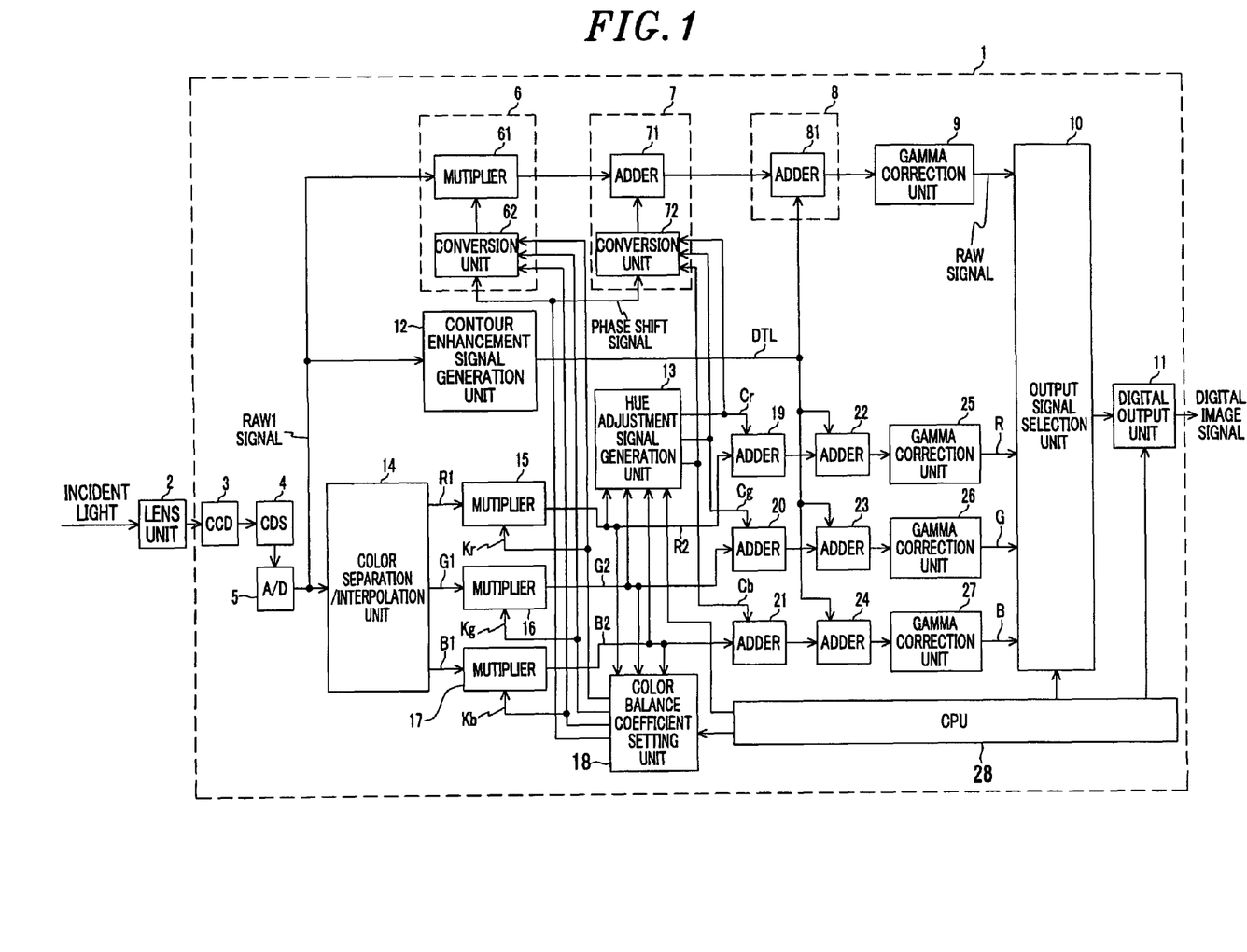
FIG. 1 is a block diagram showing an image pickup apparatus in accordance with an embodiment of the present invention.

FIG. 1 is a block diagram showing the image pickup apparatus in accordance with the embodiment of the present invention.

Therein, reference numeral 1 indicates the image pickup apparatus; 2 denotes a lens unit that forms an image from incident light; 3 represents a CCD (Charge Coupled Device) unit that converts the incident light received by the lens unit 2 into an electric signal; 4 denotes a CDS (Correlated Double Sampling) unit that eliminates noise from the electric signal produced from the CCD unit 3; and 5 indicates an A/D converter (Analog Digital Converter) that converts an analog signal produced from the CDS 4 into a digital signal (i.e., a RAW1 signal). Further, reference numeral 6 indicates a color balance adjustment unit for adjusting a color balance of the RAW1 signal produced from the A/D converter 5; 7 designates a hue adjustment unit for adjusting a hue of an output signal of the color balance adjustment unit 6; and 8 indicates a contour enhancement unit for enhancing a contour of an output signal of the hue adjustment unit 7.

In addition, reference numeral 9 indicates a gamma correction unit for performing linearity correction or nonlinear operation on an output signal from the contour enhancement unit 8; 10 represents an output signal selection unit that selects an output video signal; 11 is a digital output unit for converting an output signal of the output signal selection unit according to a specified video signal format; 12 indicates a contour enhancement signal generation unit for generating a contour enhancement signal DTL from the RAW1 signal; 14 denotes a color separation/interpolation unit for separating the RAW1 signal into an R1 signal (red), a G1 signal (green) and a B1 signal (blue) and then performing color interpolation thereon; and 28 denotes a CPU (Central Processing Unit) for controlling each unit in the image pickup apparatus 1.

Further, reference numeral 15 indicates a multiplier for adjusting a signal level of the R1 signal extracted by the color separation/interpolation unit 14 to thereby output an R2 signal; 16 represents a multiplier for adjusting a signal level of the G1 signal extracted by the color separation/interpolation unit 14 to thereby output a G2 signal; and 17 denotes a multiplier for adjusting a signal level of the B1 signal extracted by the color separation/interpolation unit 14 to thereby output a B2 signal. Herein, the multipliers 15 to 17 adjust color balance or white balance. In addition, reference numeral 18 indicates a color balance coefficient setting unit for measuring signal levels of signals coming from the multipliers 15 to 17 to thereby output color balance adjustment coefficients.

Further, reference numeral 13 indicates a hue adjustment signal generation unit for generating a hue adjustment signal based on a signal level of an output signal of each of the multipliers 15 to 17; 19 denotes an adder for performing a hue adjustment of the R2 signal; 20 denotes an adder for performing a hue adjustment of the G2 signal; and 21 indicates an adder for performing a hue adjustment of the B2 signal. Further, reference numeral 22 represents an adder for performing a contour enhancement on an output signal of the adder 19; 23 indicates an adder for performing a contour enhancement on an output signal of the adder 20; and 24 represents an adder for performing a contour enhancement on an output signal of the adder 21.

In addition, reference numeral 25 is a gamma correction unit for performing linearity correction or nonlinear operation on a signal from the adder 22; 26 indicates a gamma correction unit for performing linearity correction or nonlinear operation on an output signal of the adder 23; and 27 denotes a gamma correction unit for performing linearity correction or nonlinear operation on an output signal of the adder 24.

In the above, the signal according to the specified video signal format outputted from the digital output unit 11 is, for example, a motion picture signal or a still picture signal in compliance with the IEEE1394 standard, the Camera Link standard, the USB standard, the Ethernet standard or the like.

Next, the operation of the image pickup apparatus 1 in accordance with the embodiment of the present invention will be described with reference to FIG. 1.

The CCD unit 3 in the image pickup apparatus 1 performs a photoelectric conversion of the incident light, whose image is formed at the lens unit 2, by a photoelectric conversion element therein, thereby outputting thus obtained electric signal to the CDS unit 4. The CDS unit 4 eliminates noise from the output signal of the CCD unit 3 to thereby output the noise-eliminated signal to the amplifier unit 5. Further, the A/D converter 5 receives an analog signal, converts it to thereby output a digital signal of, e.g., 12 bits. In response to a control signal produced from the CPU 28, the color separation/interpolation unit 14 separates the digital signal outputted from the A/D converter 5 into respective digital color image signals of the R1 signal, the G1 signal and the B1 signal, which are then respectively fed to the multipliers 15, 16 and 17.

The color balance coefficient setting unit 18 measures the signal level of each of the signals outputted from the multipliers 15 to 17 to thereby output color balance adjustment coefficients Kr, Kg and Kb. The multiplier 15 outputs the R2 signal by multiplying the R1 signal separated at the color separation/interpolation unit 14 with the coefficient Kr. Further, the multiplier 16 outputs the G2 signal acquired by multiplying the G1 signal separated at the color separation/interpolation unit 14 with the coefficient Kg, and the multiplier 17 outputs the B2 signal by multiplying the B1 signal separated at the color separation/interpolation unit 14 with the coefficient Kb. That is, the multipliers 15 to 17 perform a color balance adjustment or a white balance adjustment by multiplying each of the color signals by the corresponding coefficient.

The hue adjustment signal generation unit 13 creates hue adjustment signals Cr, Cg and Cb from the R2, G2 and B2 signals outputted from the multipliers 15 to 17. Further, the adder 19 adds the hue adjustment signal Cr to the R2 signal to output thus added signal to the adder 22; the adder 20 adds the hue adjustment signal Cg to the G2 signal to output thus added signal to the adder 23; and the adder 21 adds the hue adjustment signal Cb to the B2 signal to output thus added signal to the adder 24.

The contour enhancement signal generation unit 12 generates the contour enhancement signal DTL from the RAW1 signal. Further, the adder 22 adds the contour enhancement signal DTL to the output signal of the adder 19 to send the resultant signal to the gamma correction unit 25; the adder 23 adds the contour enhancement signal DTL to the output signal of the adder 20 to send the resultant signal to the gamma correction unit 26; and the adder 24 adds the contour enhancement signal DTL to the output signal of the adder 21 to send the resultant signal to the gamma correction unit 27.

The gamma correction unit 25 generates an R signal by performing linearity correction or nonlinear operation on the output signal of the adder 22; the gamma correction unit 26 generates a G signal by performing linearity correction or nonlinear operation on the output signal of the adder 23; and the gamma correction unit 27 generates a B signal by performing linearity correction or nonlinear operation on the output signal of the adder 24. Further, the output signal selection unit 10 selectively outputs one of the RAW signal, the R signal, the G signal and the B signal to the digital output unit 11 in response to the control signal produced from the CPU 28. Finally, in response to the control signal sent from the CPU 28, the digital output unit 11 outputs a digital image signal by converting the output signal of the output signal selection unit 10 in compliance with a specified video signal format.

Figure 2:
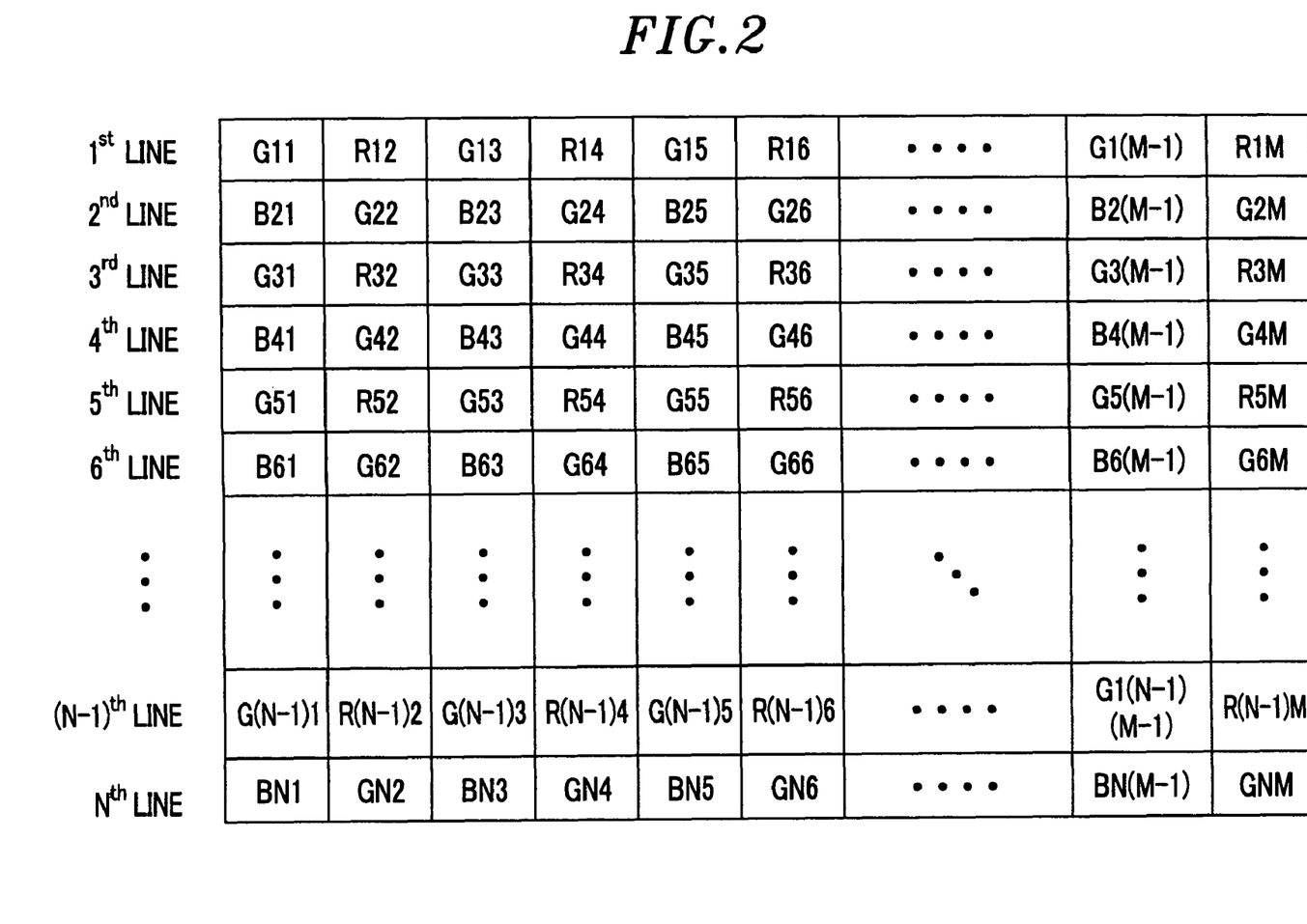
FIG. 2 is a view illustrating an arrangement of color filters in a color CCD.

FIG. 2 is a view illustrating an arrangement of color filters in a color CCD.

FIG. 2 shows a pixel array in the CCD unit 3, wherein each of squares indicates one pixel, and "R", "G" and "B" in the squares represent pixel colors. Specifically, R indicates a pixel coated with a red filter, G indicates a pixel coated with a green filter, and B indicates a pixel coated with a blue filter. The pixel coated with the red filter converts red light filtered by the red filter into an electric signal; the pixel coated with a green filter converts green light filtered by the green filter into an electric signal; and the pixel coated with a blue filter converts blue light filtered by the blue filter into an electric signal. Further, each number in the squares in FIG. 2 denotes a pixel position, wherein a tens digit indicates a row and a units digit indicates a column.

In the pixel array of the present embodiment, pixels in the first line are arranged in the order of G11, R12, G13, R14, G15, R16, . . . , G1(M−1) and R1M; those in the second line are arranged in the order of B21, G22, B23, G24, B25, G26, . . . , B2(M−1) and G2M; those in the (N−1)th line are arranged in the order of G(N−1)1, R(N−1)2, G(N−1)3, R(N−1)4, G(N−1)5, R(N−1)6, . . . , G(N−1)(M−1) and R(N−1)M; and those in the Nth line are arranged in the order of BN1, GN2, BN3, GN4, BN5, GN6, . . . , BN(M−1) and GNM. Herein, each of M and N is a multiple of 2. Further, the order of pixels being read out from a video signal is same as described above. That is, the video signal is read out in the order of G11, R12, G13, R14, . . . , BN(M−1) and GNM.

Figure 3A:
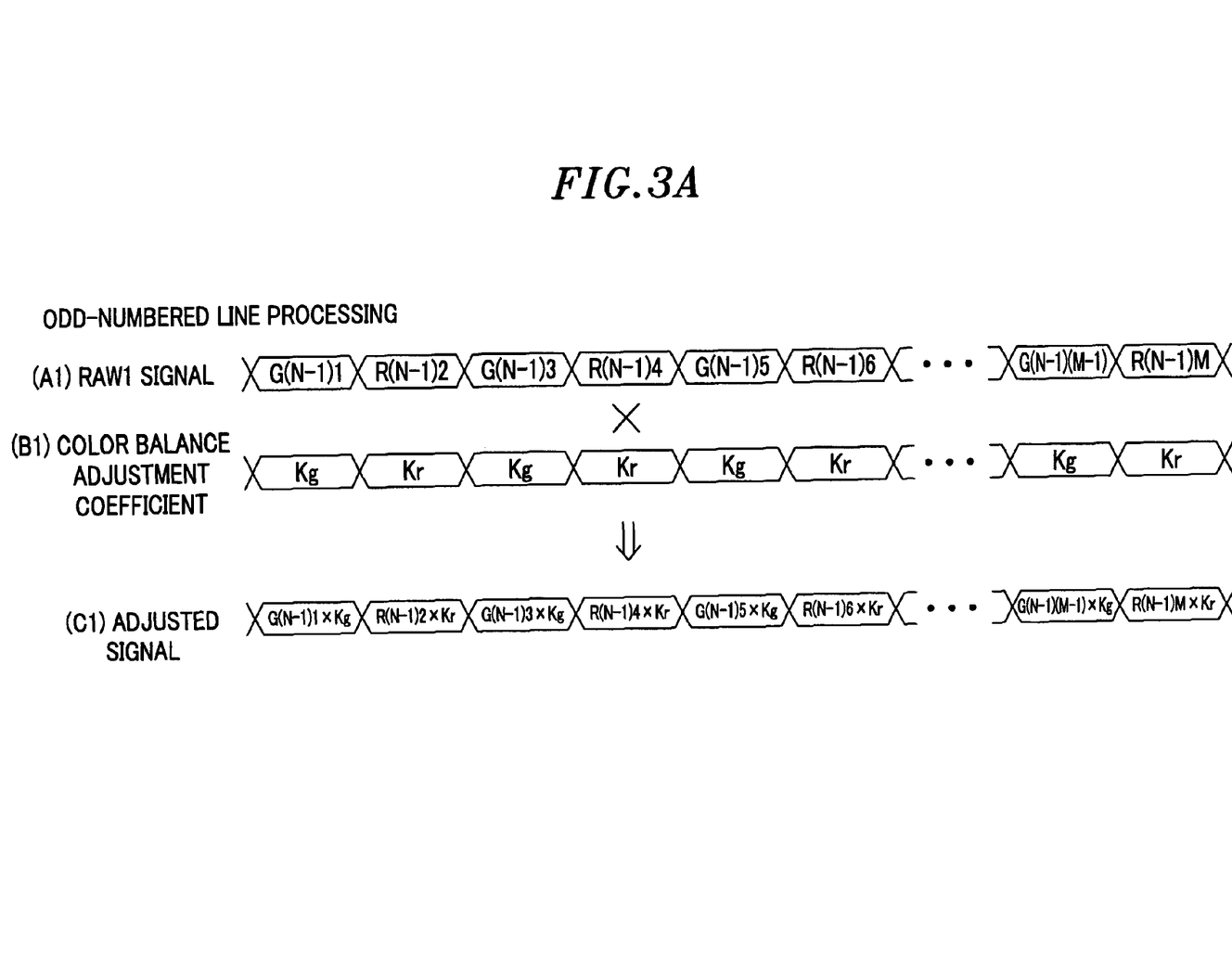
FIGS. 3A and 3B are views for explaining a color balance adjustment in accordance with the embodiment of the present invention.
Figure 3B:
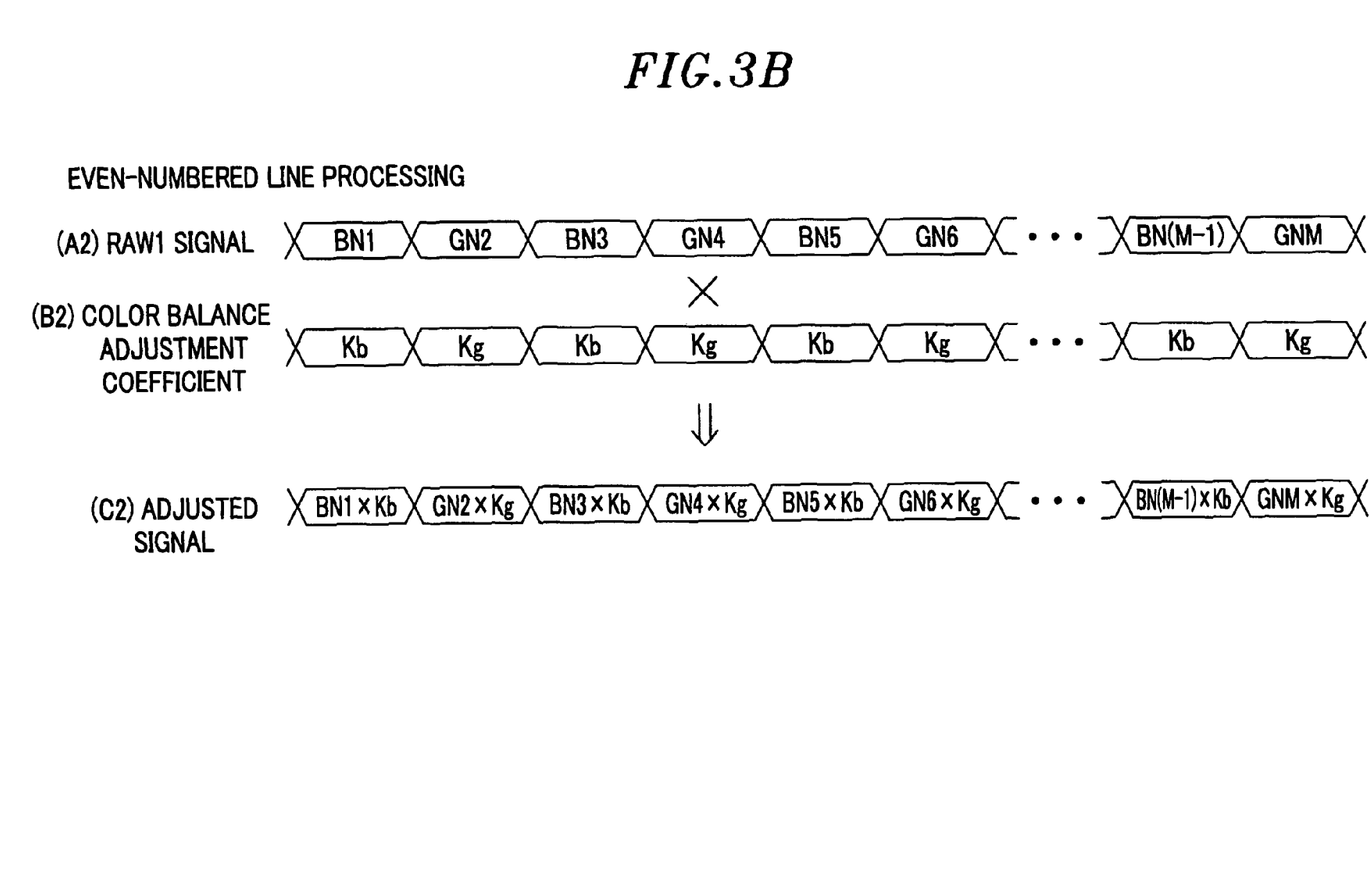

A color balance adjustment in accordance with the embodiment of the present invention will be described with reference to FIGS. 1, 2, 3A and 3B. FIGS. 3A and 3B are views for explaining the color balance adjustment in accordance with the present embodiment.

The RAW1 signal outputted from the A/D converter 5 is fed to a multiplier 61 in the color balance adjustment unit 6. A conversion unit 62 in the color balance adjustment unit 6 changes the adjustment coefficients according to a color signal of the RAW1 signal.

In the following, the operations of the color balance adjustment will be described in detail. The color balance adjustment unit 6 mainly performs a white balance adjustment on the RAW1 signal. It requires complicated processes to generate a color balance adjustment signal directly from the RAW1 signal. For this reason, the color balance adjustment on the RAW1 signal is carried out in an indirect manner using the color balance adjustment coefficients Kr, Kg and Kb acquired by the color balance coefficient setting unit 18 from the R1 signal, the G1 signal and the B1 signal.

The operations of the color balance adjustment in accordance with an embodiment will now be explained. For example, an incident light reflected from a white or achromatic object forms an image in the lens unit 2, which is captured by the CCD unit 3. The CCD unit 3 outputs to the CDS unit 4 an analog signal obtained by a photoelectric conversion of the incident light. The CDS unit 4 eliminates noises from the analog signal outputted from the CCD unit 3, and then outputs the noise-eliminated signal to the A/D converter 5. The A/D converter 5 converts the analog signal outputted from the CDS unit 4 into a digital signal, and then outputs the digital signal to the color balance adjustment unit 6, the contour enhancement signal generation unit 12 and the color separation/interpolation unit 14.

The color separation/interpolation unit 14 separates the digital signal outputted from the A/D converter 5 into the R1, G1 and B1 signals. As the R1 signal, R12, R14, R16, ..., R1M, R32, R34, R36, ..., R3M, R52, R54, R56, ..., R5M, ..., R(N−1)2, R(N−1)4, R(N−1)6, ..., R(N−1)M are sequentially outputted from the color separation/interpolation unit 14. Further, as the G1 signal, G11, G13, G14, G15, ..., G1(M−1), G22, G24, G26, ..., G2M, G31, G33, G35, ..., G3(M−1), G42, G44, G46, ..., G4M, G51, G53, G55, ..., G5(M−1) G62, G64, G66, ..., G6M, ..., G(N−1)1, G(N−1)3, G(N−1)5, ..., G(N−1) (M−1), GN2, GN4, GN6, ..., GNM are sequentially outputted from the color separation/interpolation unit 14. Further, as the B1 signal, B21, B23, B25, ..., B2(M−1), B41, B43, B45, ..., B4(M−1), B61, B63, B65, ..., B6(M−1), ..., BN1, BN3, BN5, ..., BN(M−1) are sequentially outputted from the color separation/interpolation unit 14.

The multiplying unit 16 multiplies the G1 signal with the adjustment coefficient Kg outputted from the color balance coefficient setting unit 18 to thereby output the G2 signal. It is possible that the adjustment coefficient Kg is set to be 1 (which means the factor to be multiplied by the multiplying unit 16 is equal to 1). However, it is also possible that the adjustment coefficient Kg is set to adjust the gain for controlling the level of the G1 signal. Further, it is also possible that the adjustment coefficient Kg is set to enable an automatic gain control adopted in the prior art.

The multiplying unit 15 multiplies the R1 signal with the adjustment coefficient Kr outputted from the color balance coefficient setting unit 18 to thereby output the R2 signal. The adjustment coefficient Kr is obtained by adding the R2 signal level to the G2 signal level. The color balance coefficient setting unit 18 compares the R2 signal level to the G2 signal level, and outputs the adjustment coefficient Kr according to the comparison result. Until the difference between the G2 signal level and the R2 signal level becomes equal to or smaller than a predetermined level, the color balance coefficient setting unit 18 increases and decreases the adjustment coefficient Kr to continue the level addition.

Likewise, the multiplying unit 17 multiplies the B1 signal with the adjustment coefficient Kb outputted from the color balance coefficient setting unit 18 to thereby output the B2 signal. The adjustment coefficient Kb is obtained by adding the B2 signal level to the G2 signal level. The color balance coefficient setting unit 18 compares the B2 signal level to the G2 signal level, and outputs the adjustment coefficient Kb according to the comparison result. Until the difference between the G2 signal level and the B2 signal level becomes equal to or smaller than a predetermined level, the color balance coefficient setting unit 18 increases and decreases the adjustment coefficient Kb to continue the level addition.

Further, the white balance adjustment of the RAW1 signal carried out by the color balance adjustment unit 6 using the adjustment coefficients Kr, Kg and Kb will now be described. The conversion unit 62 selects among the adjustment coefficients Kr, Kg and Kb to output the selected one in response to a phase conversion signal outputted by the color balance coefficient setting unit 18 according to the color signal inputted to the multiplier 61.

If the inputted RAW1 signal is GNM, Kg is outputted from the conversion unit 62. Therefore, the multiplier 61 multiplies GNM with Kg to output the resultant value to the adder 71. However, if the inputted RAW1 signal is R(N−1)M, Kr is outputted from the conversion unit 62. Therefore, the multiplier 61 multiplies R(N−1)M with Kr to output the resultant value to the adder 71. Further, if the inputted RAW1 signal is BN(M−1), Kb is outputted from the conversion unit 62. Therefore, the multiplier 61 multiplies BN(M−1) with Kb to output the resultant value to the adder 71. In this manner, by selectively multiplying the adjustment coefficients Kr, Kg and Kb according to the color of the RAW1 signal, the white balance adjustment can be performed.

Hereinafter, the color balance adjustment in a case where the signal fed to the multiplier 61 is in an odd-numbered line (e.g., (N−1)th line) of FIG. 2 will be explained with reference to FIG. 3A. In an odd-numbered line processing, the multiplier 61 multiplies an RAW1 signal 3A, whose value is sequentially G(N−1)1, R(N−1)2, G(N−1)3, R(N−1)4, G(N−1)5, R(N−1)6, ..., G(N−1) (M−1) and R(N−1)M, with color balance adjustment coefficients B2, which are sequentially Kg, Kr, Kg, Kr, Kg, Kr, ..., Kg and Kr. Thus, the multiplier outputs the resultant signal as an adjusted signal C1, whose value is sequentially G(N−1)1×Kg, R(N−1)2×Kr, G(N−1)3×Kg, R(N−1)4×Kr, G(N−1)5×Kg, R(N−1)6×Kr, ..., G(N−1) (M−1)×Kg and R(N−1) M×Kr.

Likewise, the color balance adjustment in a case where the signal fed to the multiplier 61 is in an even-numbered line (e.g., Nth line) of FIG. 2 will be explained with reference to FIG. 3B. In an even-numbered line processing, the multiplier 61 multiplies a RAW1 signal A2, whose value is sequentially BN1, GN2, BN3, GN4, BN5, GN6, ..., BN(M−1) and GNM, with color balance adjustment coefficients B2, which are sequentially Kb, Kg, Kb, Kg, Kb, Kg, ..., Kb and Kg. Thus, the multiplier 61 outputs the resultant signal as an adjusted signal C2, whose value is sequentially BN1×Kb, GN2×Kg, BN3×Kb, GN4×Kg, BN5×Kb, R(N−1)6×Kr, ..., BN(M−1)×Kb and GNM×Kg.

Figure 4A:
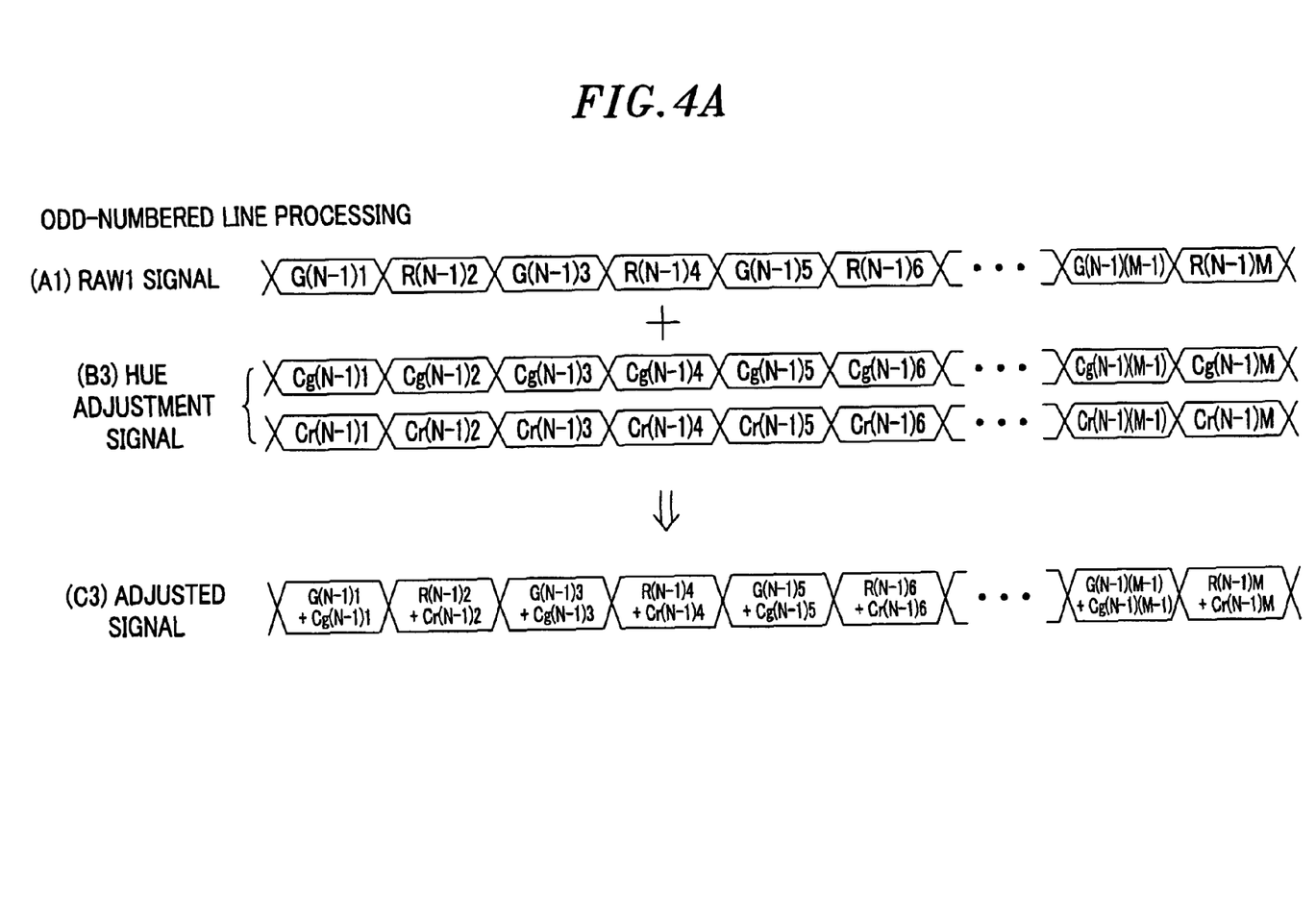
FIGS. 4A and 4B are views for explaining a hue adjustment in accordance with the embodiment of the present invention.
Figure 4B:
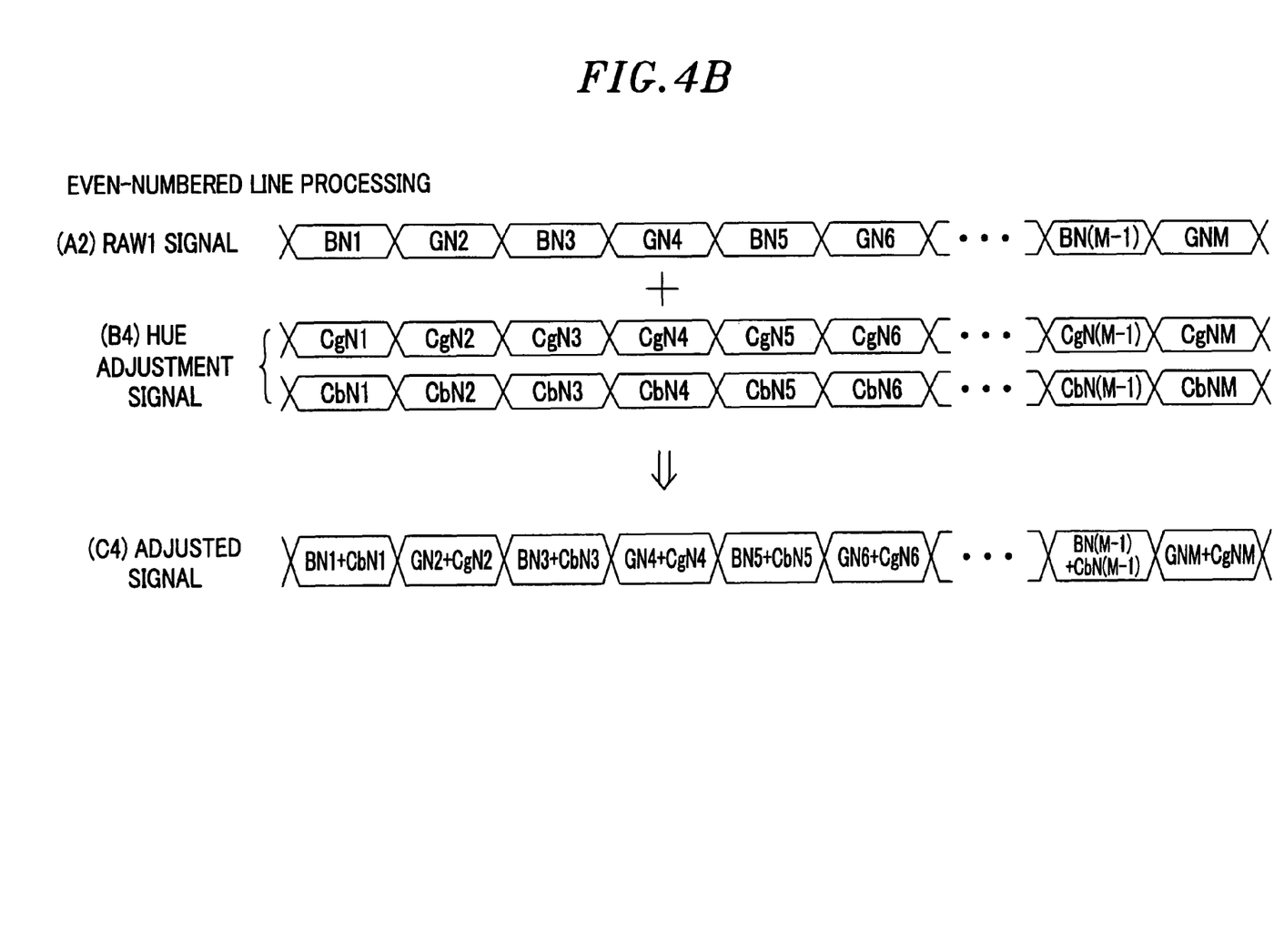

Further, a hue adjustment in accordance with the embodiment of the present invention will be described with reference to FIGS. 1, 2, 4A and 4B. FIGS. 4A and 4B are views for explaining the hue adjustment in accordance with the present embodiment.

The output signal of the multiplier 61 is fed to the adder 71 in the hue adjustment unit 7. However, for simplicity, the following description will be presented in the assumption that the signal fed to an adder 71 is the RAW1 signal that is not processed by the color balance adjustment unit 6. A conversion unit 72 in the hue adjustment unit 7 changes the adjustment coefficients according to a color signal of the RAW1 signal.

In the following, the operations of the hue adjustment will be described in detail. The hue adjustment unit 7 performs a hue adjustment on the signal outputted from the multiplier 61.

It requires complicated processes to generate a hue adjustment signal directly from the color-balance-adjusted RAW1 signal outputted from the multiplier 61. For this reason, the hue adjustment on the color-balance-adjusted RAW1 signal is carried out in an indirect manner using the hue adjustment signals Cr, Cg and Cb acquired by the hue adjustment signal generation unit 13 from the R2 signal, the G2 signal and the B2 signal. A detailed description about the generation of the hue adjustment signals Cr, Cg and Cb is disclosed in, for example, Japanese Patent Application Publication No. 9-247701.

The operations of the hue adjustment in accordance with an embodiment will now be explained. For example, an incident light reflected from an object (such as a color bar chart used for hue adjustment) forms an image in the lens unit 2, which is captured by the CCD unit 3. The operations of the components from CCD unit 3 to the multipliers 15 to 17 are same as those in the color balance adjustment.

The hue adjustment signal generation unit 13 receives the R2, G2 and B2 signals to generate the hue adjustment signal Cr, Cg and Cb, which are adjustment signals for enhancing the color reproduction quality of the R2, G2 and B2 signals.

Further, the hue adjustment of the color-balance-adjusted RAW1 signal carried out by the hue adjustment unit 7 using the adjustment signals Cr, Cg and Cb will now be described. The conversion unit 72 selects among the adjustment signals Cr, Cg and Cb to output the selected one in response to a phase conversion signal outputted by the color balance coefficient setting unit 18 according to the color signal inputted to the multiplier 71.

If the inputted color-balance-adjusted RAW1 signal is GNM, Cg is outputted from the conversion unit 72. Therefore, the adder 71 adds the color-balance-adjusted GNM to the hue adjustment signal Cg to output the resultant value to the adder 81. However, if the inputted color-balance-adjusted RAW1 signal is R(N−1)M, Cr is outputted from the conversion unit 72. Therefore, the adder 71 adds the color-balance-adjusted R(N−1)M to the hue adjustment signal Cr to output the resultant value to the adder 81. Further, if the inputted color-balance-adjusted RAW1 signal is BN(M−1), Cb is outputted from the conversion unit 72. Therefore, the adder 71 adds the color-balance-adjusted BN(M−1) to the hue adjustment signal Cb to output the resultant value to the adder 81. In this manner, by selectively adding the adjustment signals Cr, Cg and Cb according to the color of the color-balance-adjusted RAW1 signal, the hue adjustment can be performed.

Hereinafter, the hue adjustment in a case where the signal fed to the adder 71 is in an odd-numbered line (e.g., (N−1)th line) of FIG. 2 will be explained with reference to FIG. 4A. In an odd-numbered line processing, the adder 71 adds the input RAW1 signal A1, whose value is sequentially G(N−1)1, R(N−1)2, G(N−1)3, R(N−1)4, G(N−1)5, R(N−1)6, . . . , G(N−1)(M−1) and R(N−1)M, to a hue adjustment signal B3, whose value is sequentially Cg(N−1)1, Cg(N−1)2, Cg(N−1)3, Cg(N−1)4, Cg(N−1)5, Cg(N−1)6, . . . , Cg(N−1)(M−1) and Cg(N−1)M, or is sequentially Cr(N−1)1, Cr(N−1)2, Cr(N−1)3, Cr(N−1)4, Cr(N−1)5, Cr(N−1)6, . . . , Cr(N−1)(M−1) and Cr(N−1)M. Then, the adder 71 outputs an adjusted signal C3 whose value is sequentially G(N−1)1+Cg(N−1)1, R(N−1)2+Cr(N−1)2, G(N−1)3+Cg(N−1)3, R(N−1)4+Cr(N−1)4, G(N−1)5+Cg(N−1)5, R(N−1)6+Cr(N−1)6, . . . , G(N−1)(M−1)+Cg(N−1)(M−1) and R(N−1)M+Cr(N−1)M.

Likewise, the hue adjustment in a case where the signal fed to the adder 71 is in an even-numbered line (e.g., Nth line) of FIG. 2 will be explained with reference to FIG. 4B. In an even-numbered line processing, the adder 71 adds the input RAW1 signal A2, whose value is sequentially BN1, GN2, BN3, GN4, BN5, GN6, . . . , BN(M−1) and GNM, to a hue adjustment signal B4, whose value is sequentially CgN1, CgN2, CgN3, CgN4, CgN5, CgN6, . . . , CgN(M−1) and CgNM, or is sequentially CbN1, CbN2, CbN3, CbN4, CbN5, CbN6, . . . , CbN(M−1) and CbNM. Then, the adder 71 outputs an adjusted signal C4 whose value is sequentially BN1+CbN1, GN2+CgN2, BN3+CbN3, GN4+CgN4, BN5+CbN5, GN6+CgN6, . . . , BN(M−1)+CbN(M−1) and GNM+CgNM.

Figure 5A:
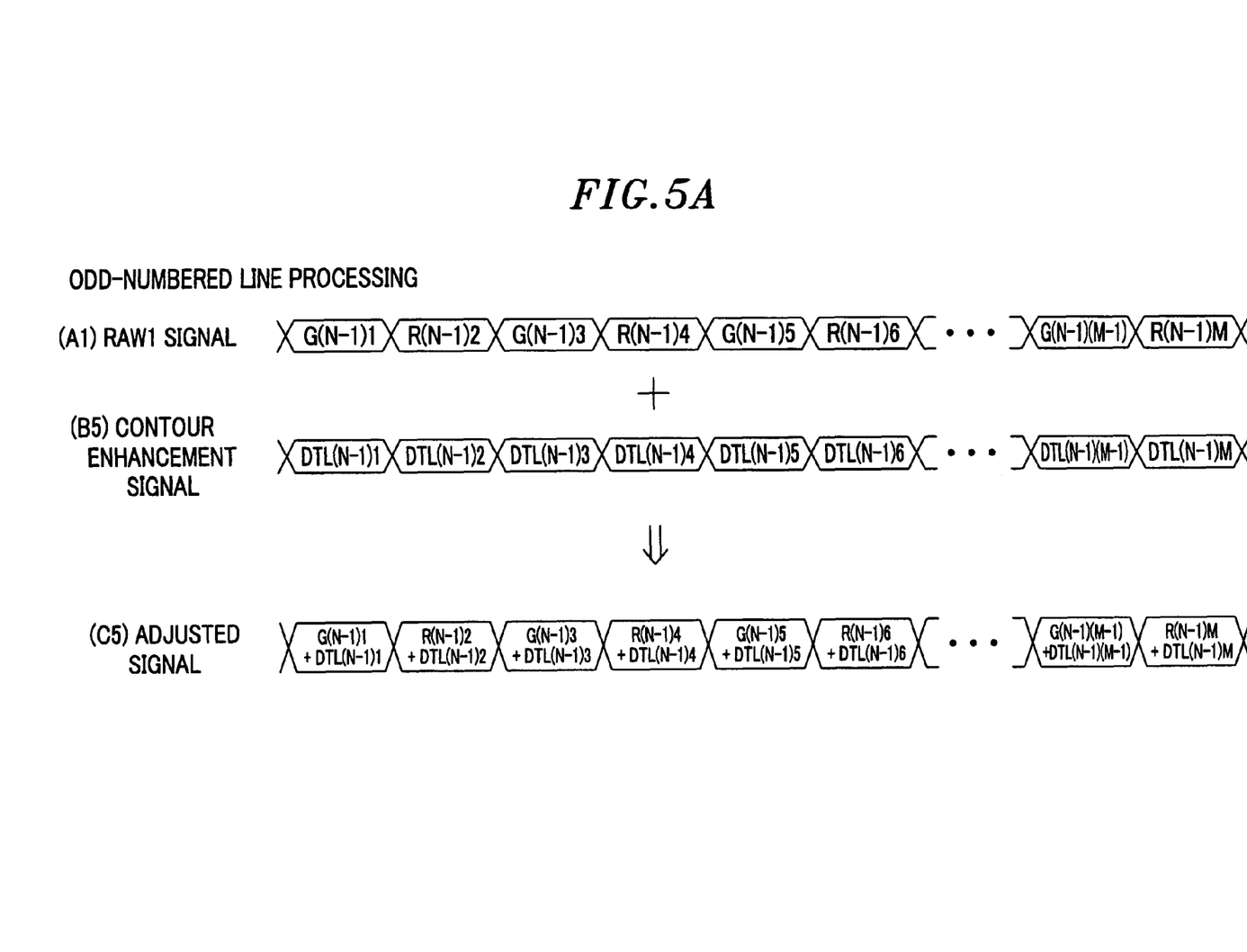
FIGS. 5A and 5B are views for explaining a contour enhancement in accordance with the embodiment of the present invention.
Figure 5B:
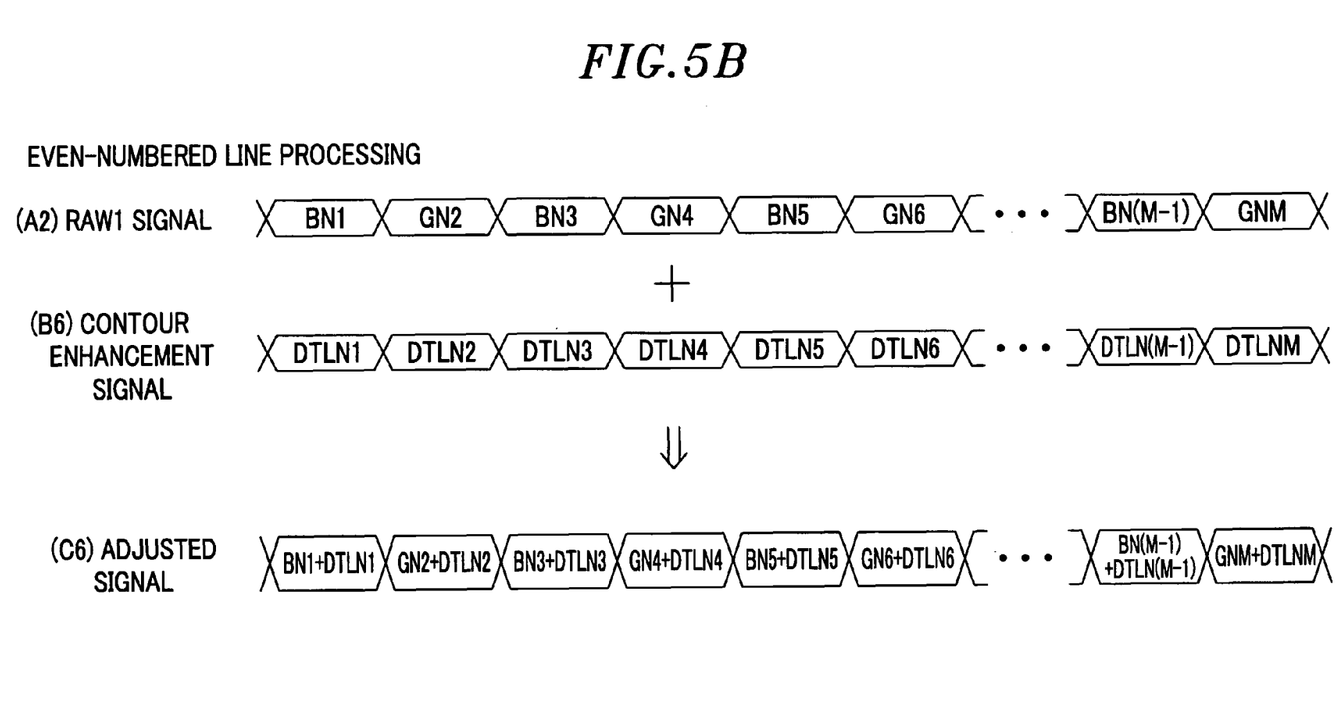

Further, a contour enhancement in accordance with the embodiment of the present invention will be described with reference to FIGS. 1, 2, 5A and 5B. FIGS. 5A and 5B are views for explaining the contour enhancement in accordance with the present embodiment.

The output signal of the adder 71 is fed to the adder 81 in the contour enhancement unit 8. However, for simplicity, the following description will be presented in the assumption that the signal fed to an adder 81 is the RAW1 signal not processed by either the color balance adjustment unit 6 or the hue adjustment unit 7. The contour enhancement signal DTL is added to the RAW1 signal without being adjusted, because it is a high frequency component common to the three colors (i.e., red, green and blue). In this manner, the high frequency component is added to a luminance component of the RAW1 signal. Hereinafter, the contour enhancement in a case where the signal fed to the adder 81 is in an odd-numbered line of FIG. 2 will be explained with reference to FIG. 5A. In an odd-numbered line processing, the adder 81 adds the RAW1 signal A1, whose value is sequentially G(N−1)1, R(N−1)2, G(N−1)3, R(N−1)4, G(N−1)5, R(N−1)6, . . . , G(N−1)(M−1) and R(N−1)M, to a contour enhancement signal DTL B5 generated by the contour enhancement signal generation unit 12, whose value is sequentially DTL(N−1)1, DTL(N−1)2, DTL(N−1)3, DTL(N−1)4, DTL(N−1)5, DTL(N−1)6, . . . , DTL(N−1)(M−1) and DTL(N−1)M. Thus, the adder 81 outputs the resultant signal as an adjusted signal C5, whose value is G(N−1)1+DTL(N−1)1, R(N−1)2+DTL(N−1)2, G(N−1)3+DTL(N−1)3, R(N−1)4+DTL(N−1)4, G(N−1)5+DTL(N−1)5, R(N−1)6+DTL(N−1)6, . . . , G(N−1)(M−1)+DTL(N−1)(M−1) and R(N−1)M+DTL(N−1)M.

Likewise, the contour enhancement in a case where the signal fed to the adder 81 is in an even-numbered line of FIG. 2 will be explained with reference to FIG. 5B. In an even-numbered line processing, the adder 81 adds the input RAW1 signal A2, whose value is sequentially BN1, GN2, BN3, GN4, BN5, GN6, . . . , BN(M−1) and GNM, to a contour enhancement signal DTL B6 generated by the contour enhancement signal generation unit 12, whose value is sequentially DTLN1, DTLN2, DTLN3, DTLN4, DTLN5, DTLN6, . . . , DTLN(M−1) and DTLNM. Thus, the adder 81 outputs the resultant signal as an adjusted signal C6, whose value is sequentially BN1+DTLN1, GN2+DTLN2, BN3+DTLN3, GN4+DTLN4, BN5+DTLN5, GN6+DTLN6, . . . , BN(M−1)+DTLN(M−1) and GNM+DTLNM.

As described above, in accordance with the present invention, the color balance adjustment, the hue adjustment and the contour enhancement can be performed on the RAW signal produced from the single CCD color video camera.

Although the present invention has been described as to the above embodiment, the present invention is not limited to the image pickup apparatus disclosed therein, and may be applied to various image pickup apparatuses or video camera systems other than the above.

While the invention has been shown and described with respect to the embodiment, it will be understood by those skilled in the art that various changes and modifications may be made without departing from the scope of the invention as defined in the following claims.

What is claimed is:

1. A video signal adjusting method for use in an image pickup apparatus employing an image pickup device in which pixels coated with different color filters are arranged, the method comprising:
   separating a video signal outputted from the pixels coated with the different color filters into three color image signals;
   generating a color balance adjustment signal and a hue adjustment signal from the separated three color image signals; and
   adjusting the video signal outputted from the pixels coated with the different color filters by using the color balance adjustment signal and the hue adjustment signal,
   wherein the video signal conveys outputs of the pixels in a preset sequential order,
   wherein said separating the video signal is performed such that each of the outputs of the pixels is conveyed by one of the three color image signals, and
   wherein the color balance adjustment signal includes three color balance adjustment coefficients for three different colors and the hue adjustment signal includes three hue adjustment coefficients for the three different colors, and
   wherein said adjusting the video signal includes:
      producing a color-balance-adjusted video signal by multiplying each of the outputs of the pixels by one of the three color balance adjustment coefficients; and
      producing a hue-adjusted video signal by adding each of the adjusted outputs of the pixels in the color-balance-adjusted video signal and one of the three hue adjustment coefficients.

2. An image pickup apparatus comprising:
   an image pickup device in which pixels coated with different color filters are arranged;
   a separation unit that separates a video signal outputted from the pixels coated with the different color filters into three color image signals;
   an adjustment signal generation unit for generating a color balance adjustment signal and a hue adjustment signal from the separated three color image signals; and
   an adjustment unit for adjusting the video signal outputted from the pixels coated with the different color filters by using the color balance adjustment signal and hue adjustment signal generated by the adjustment signal generation unit,
   wherein the video signal conveys outputs of the pixels in a preset sequential order,
   wherein the separation unit separates the video signal such that each of the outputs of the pixels is conveyed by one of the three color image signals,
   wherein the color balance adjustment signal includes three color balance adjustment coefficients for three different colors and the hue adjustment signal includes three hue adjustment coefficients for the three different colors, and
   wherein the adjustment unit includes:
      a color balance adjustment unit that produces a color-balance-adjusted video signal by multiplying each of the pixel outputs of the video signal by one of the three color balance adjustment coefficients; and
      a hue adjustment unit that produces a hue-adjusted video signal by adding the color-balance-adjusted video signal and one of the three hue adjustment coefficients.

3. The video signal adjusting method of claim 1, wherein the video signal is a raw video signal conveying pixel outputs of a red color, a green color, and a blue color in a preset sequential order, and the three color image signals include a red image signal, a green image signal, and a blue image signal that convey the pixel outputs of the red color, the green color, and the blue color, respectively.

4. The video signal adjusting method of claim 1, wherein the color balance adjustment signal is generated based on a comparison result of signal levels between the three color image signals so that differences between the signal levels are small or equal to a threshold level.

5. The video signal adjusting method of claim 1, wherein the hue adjustment signal is generated such that color reproduction quality of the video signal is enhanced.

6. The video signal adjusting method of claim 1, further comprising:
   adjusting the three color image signals by using the color balance adjustment signal and the hue adjustment signal; and
   selectively outputting the adjusted video signal or the adjusted three color image signals.

7. The image pickup apparatus of claim 2, wherein the video signal is a raw video signal conveying pixel outputs of a red color, a green color, and a blue color in a preset sequential order, and the three color image signals include a red image signal, a green image signal, and a blue image signal that convey the pixel outputs of the red color, the green color, and the blue color, respectively.

8. The image pickup apparatus of claim 2, wherein the adjustment signal generation unit generates the color balance adjustment signal based on a comparison result of signal levels between the color image signals so that differences between the signal levels are small or equal to a threshold level.

9. The image pickup apparatus of claim 2, wherein the adjustment signal generation unit generates the hue adjustment signal such that color reproduction quality of the video signal is enhanced.

10. The image pickup apparatus of claim 2, further comprising:
   another adjustment unit for adjusting the three color image signals by using the color balance adjustment signal and the hue adjustment signal; and
   an output signal selection unit that selectively outputs the adjusted video signal or the adjusted three color signals.

* * * * *